(12) United States Patent
Dupuis et al.

(10) Patent No.: US 8,509,447 B2
(45) Date of Patent: Aug. 13, 2013

(54) METHOD AND SYSTEM FOR DISTRIBUTING CRYPTOGRAPHIC KEYS IN A HIERARCHIZED NETWORK

(75) Inventors: Vincent Dupuis, Issy les Moulineaux (FR); Marc Chaland, Levis St Nom (FR); Patrick Radja, Bonnelles (FR); Stephane Allouche, Senantes (FR); Ahmed Serhrouchni, Paris, FL (US); Mustapha Adib, Paris (FR)

(73) Assignee: Cassidian SAS, Elancourt (FR)

( * ) Notice: Subject to any disclaimer, the term of this patent is extended or adjusted under 35 U.S.C. 154(b) by 242 days.

(21) Appl. No.: 12/742,435

(22) PCT Filed: Nov. 13, 2008
(Under 37 CFR 1.47)

(86) PCT No.: PCT/FR2008/052037
§ 371 (c)(1),
(2), (4) Date: Sep. 15, 2010

(87) PCT Pub. No.: WO2009/068815
PCT Pub. Date: Jun. 4, 2009

(65) Prior Publication Data
US 2011/0261962 A1    Oct. 27, 2011

(30) Foreign Application Priority Data

Nov. 13, 2007    (FR) ...................................... 07 07972

(51) Int. Cl.
*H04L 9/00*    (2006.01)
(52) U.S. Cl.
USPC ............ 380/279; 380/277; 380/278; 713/171

(58) Field of Classification Search
USPC .................................. 713/171; 380/277–279
See application file for complete search history.

(56) References Cited

U.S. PATENT DOCUMENTS

| 6,606,706 | B1 * | 8/2003 | Li ................................. | 713/162 |
| 2005/0204049 | A1 * | 9/2005 | Ueoka et al. .................. | 709/229 |
| 2006/0010324 | A1 * | 1/2006 | Appenzeller et al. ......... | 713/171 |
| 2007/0263875 | A1 * | 11/2007 | Kitaya et al. .................. | 380/279 |

OTHER PUBLICATIONS

Preliminary Search Report, FR 0707972, dated Jul. 25, 2008.
PCT International Report, International Application No. PCT/FR2008/052037, dated Jun. 18, 2009.
PCT Notification of Opinion, International Application No. PCT/FR2008/052037, dated Jun. 18, 2009.
Written Opinion, FR 0707972, dated Nov. 13, 2007.
PCT Opinion, International Application No. PCT/FR2008/052037, dated Nov. 13, 2007.

* cited by examiner

*Primary Examiner* — Ghazal Shehni
(74) *Attorney, Agent, or Firm* — Gardere Wynne Sewell LLP; Andre M. Szuwalski

(57) ABSTRACT

A method is presented for distributing cryptographic keys in a hierarchized network including at least one device in charge of a higher group of devices, wherein at least one of the devices of the higher group of devices is also in charge of a lower group of devices. The method includes the steps of: a) storing a set of identifiers particular to the higher group, an identifier particular to the device in charge, an identifier per device in charge of a lower group, each identifier being unique; storing a root cryptographic key; c) providing a root cryptographic key to each device in charge of a lower group using a first non-reversible cryptographic function; d) providing at least one transport cryptographic key to each member of said higher group of devices using a second non-reversible cryptographic function.

10 Claims, 2 Drawing Sheets

METHOD AND SYSTEM FOR DISTRIBUTING CRYPTOGRAPHIC KEYS IN A HIERARCHIZED NETWORK

PRIORITY CLAIM

This application is a 371 filing from PCT/FR2008/052037 (WO 2009/068815) which claims priority from French Application for Patent No. 07 07972 filed Nov. 13, 2007, the disclosures of which are hereby incorporated by reference.

TECHNICAL FIELD

The present invention relates to a method and a system for distributing cryptographic keys in a hierarchized network. It also relates to a device and a computer program for applying the method.

BACKGROUND

When considering the communication networks used by organizations that have to intervene in difficult environments such as the fire and rescue service, the civil defense service, the police or the army, they are characterized by an organization structured hierarchically in groups. Within one group, all the users communicate freely, but it is necessary to introduce partitioning between users of different groups. Specifically, experience shows that, in a broadcast communication mode, that is to say that each user communicates with all of the users of the group, the multiplication, in particular, of the oral interventions associated with stress situations generates a noise which prevents the transmission of pertinent information when the group exceeds about ten users.

Partitioning can be created by the use of different transmission channels for each group. But it is also possible to combine this approach by encrypting each communication channel with a different group key in order to ensure the seal between the groups also making it possible to maintain the confidentiality of certain information.

The only communications that can be decrypted by a terminal of the group are those generated for which the terminal has a cryptographic key which is itself attached to a group.

The use of encrypted communications also makes it possible to maintain confidentiality of the interchanges and is therefore particularly preferred by the military and the public safety professionals who have a need to maintain confidentiality of information.

In the prior art, the generation of the cryptographic keys is carried out by a central machine, called a key-distribution server or station, and each terminal of the network receives its cryptographic key or keys from this central machine before deployment on the ground.

This centralized management of the cryptographic keys has the drawback of greatly limiting the possibilities of reorganization and restructuring of the network if the link with this central machine should be lost thus depriving the group organization of all impetus.

Therefore, if, for any reason, the terminal of the group responsible for maintaining the communication link between the group and the higher hierarchy becomes unavailable, just as does any possible backup solution such as the use of a second terminal, the group is then cut off from all communication with the rest of the structure. It then becomes necessary for this group to return to a location such as a base camp or quarters where it can be reorganized and obtain new cryptographic keys allowing it to reintegrate the communication network of the structure.

Likewise the merging of two groups will require return to a location where the provision of new keys can be carried out whereas the constraints of the situation may require that the merger is carried out immediately, on the site of the action while maintaining the confidentiality of the previous interchanges.

It would then be particularly advantageous to produce a management of the cryptographic keys that is particularly robust to withstand an accident and which allows a rapid reorganization of the network.

SUMMARY

To respond to this need, according to one aspect of the invention, the proposal is for a method for managing cryptographic keys in a hierarchized network comprising at least one device responsible for a higher group of devices, at least one of the devices of said group of devices also being responsible for a lower group of devices, characterized in that it comprises the steps, at the device responsible for the higher group, of:

a. storage
  of a set of identifiers specific to the higher group,
  of an identifier specific to the responsible device,
  of an identifier for each device responsible for a lower group,
  each identifier being unique inside the hierarchized network, b. storage of a root cryptographic key, c. supply of a root cryptographic key to each device responsible for a lower group by derivation from the root key and from the identifier of said device responsible for the lower group by a first, nonreversible cryptographic function, d. supply of at least one transport cryptographic key to each member of said higher group of devices by derivation from the root key and from an identifier belonging to the set of identifiers specific to said group by a second, nonreversible cryptographic function.

This advantageously provides a decentralized management of the cryptographic keys which respects the hierarchical structure of the organization. In this way, the distribution of the keys can be carried out as close as possible to the locations where the users are engaged. For example, a user who is isolated because he has lost his group can join another group simply by acquiring, from the head of this group, the transport cryptographic key or keys that are or will be used by this group.

According to another aspect of the invention, the proposal is for a method for distributing cryptographic keys in a hierarchized network comprising at least one device responsible for a higher group of devices, said method being applied by a device of said group of devices also responsible for a lower group of devices, characterized in that it comprises the steps of:

a. storage of a root cryptographic key, b. storage of an identifier that is specific thereto and is unique in the hierarchized system, c. generation of a transport cryptographic key by derivation from the root cryptographic key and from one of the identifiers of the set of identifiers specific to the group, d. distribution of the transport cryptographic key to the devices that are members of the group.

According to another aspect of the invention, a computer program is proposed comprising instructions for the application of one of the methods when said instructions are executed on a computer.

According to another aspect of the invention, a system for distributing cryptographic keys in a hierarchized network is proposed comprising at least one device responsible for a higher group of devices, at least one of the devices of said group of devices also being responsible for a lower group of devices, characterized in that it comprises:

a. means for defining, for each group, a set of identifiers that is specific thereto, and, for each device responsible for a group, a responsible-device identifier that is specific thereto and unique in the hierarchized network.

b. means for installing a root cryptographic key in the device responsible for the higher group.

c. first means for supplying a root cryptographic key to each device responsible for a lower group by derivation from the root key of the device responsible for the higher group and from the identifier of said device responsible for the lower group by a first, nonreversible cryptographic function.

d. for each group of devices, second means for supplying at least one transport cryptographic key to each member of said group of devices by derivation from the root key of the device responsible for said group and from an identifier belonging to the set of identifiers of said group by a second, nonreversible cryptographic function.

According to another aspect of the invention, a device responsible for a group of devices in a hierarchized network is also proposed, characterized in that it comprises:

a. first means for storage of a root cryptographic key, b. second means for storage of an identifier that is specific thereto and is unique in the hierarchized system and of a set of identifiers specific to the group, c. means for generating a transport cryptographic key by derivation from the root cryptographic key and from one of the identifiers of the set of identifiers specific to the group, d. means for distributing the transport cryptographic key to the member devices of the group.

Other features and embodiments are described in the dependent claims.

BRIEF DESCRIPTION OF THE DRAWINGS

The invention will be better understood on reading the following description given only as an example and made with reference to the figures in which.

DETAILED DESCRIPTION OF THE DRAWINGS

Figure 1:
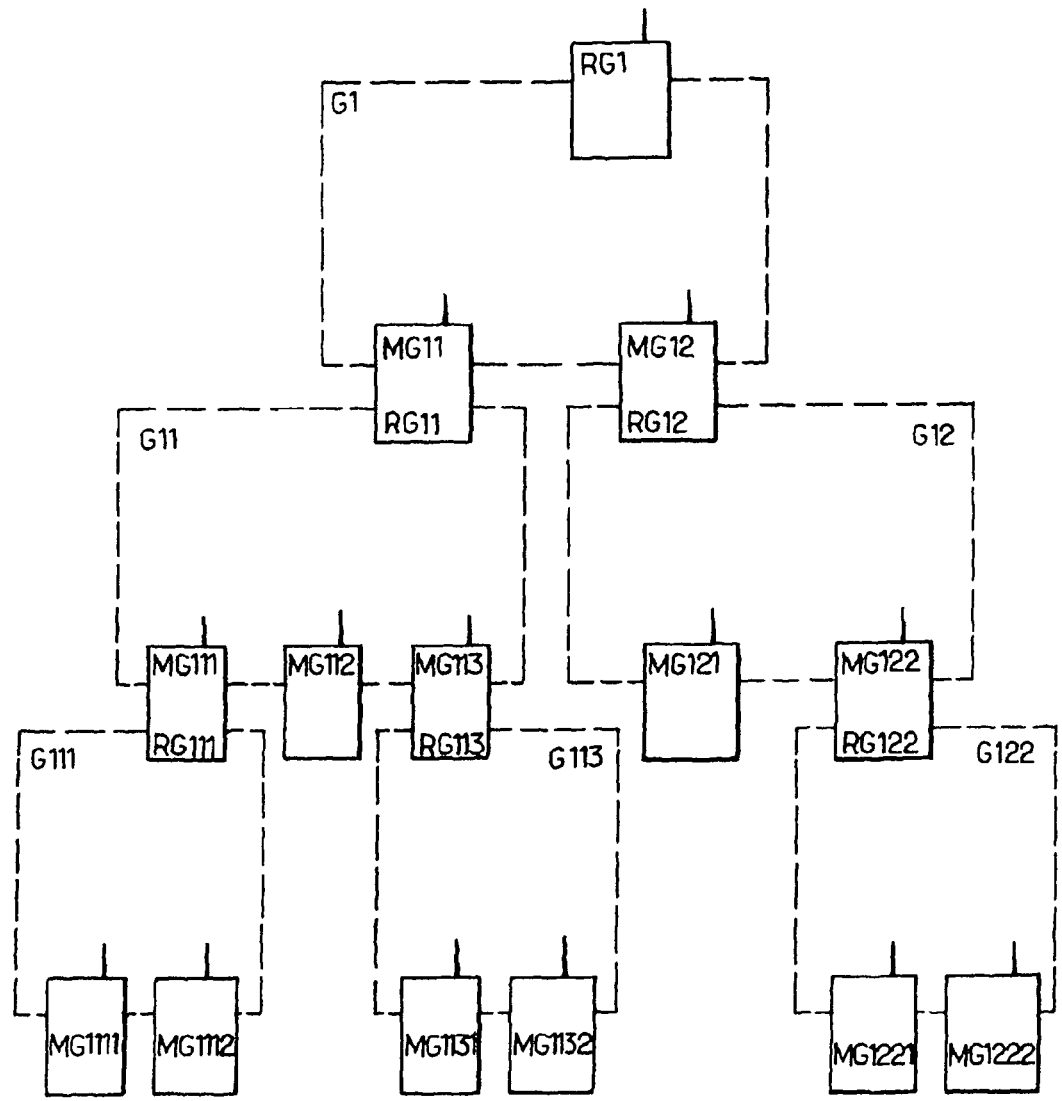
FIG. 1 is a schematic view of a hierarchized network with a system for distributing cryptographic keys according to an embodiment of the invention.

With reference to FIG. 1, a hierarchized network consists of groups $G_1$, $G_{11}$, $G_{12}$, $G_{111}$, $G_{113}$ and $G_{122}$ symbolized in FIG. 1 by closed dashed lines. These groups form a hierarchy in which the group $G_1$ is the higher-level group, the groups $G_{11}$, $G_{12}$ are intermediate-level groups and the groups $G_{111}$, $G_{113}$, $G_{122}$ are the lower-level groups.

A device belonging to the intermediate hierarchy of the network therefore has two roles symbolized by two reference numbers, a first reference number indicating that it belongs as a member of the group of level n and a second reference number indicating its role as being responsible for the group of the lower level n−1. For example, the device $RG_{11}/MG_{11}$ has a reference number $MG_{11}$ as a member of the group $G_1$ with a rank 1 and a reference $RG_{11}$ as a device responsible for the group $G_{11}$.

Figure 2:
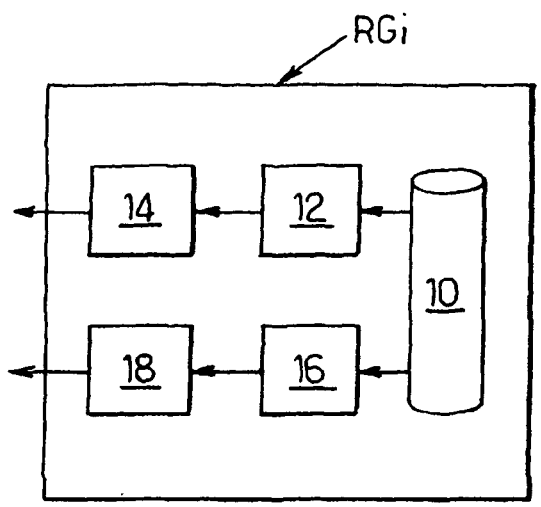
FIG. 2 is a schematic view of a responsible device in the hierarchized network of FIG. 1.

Each responsible device $RG_i$ of group $G_i$ comprises, in FIG. 2, means 10 for storage of a root cryptographic key $RK_i$, a set of identifiers $IG_{ik}$, k=1 . . . n specific and unique to the group, and unique identifiers $IR_I$ of the responsible devices $RG_I$ of the groups $G_I$ of the level below the group $G_i$, which devices are also members of the group $G_i$, and are also called subordinate responsible devices.

The responsible devices $RG_i$ also comprise first means 12 for generating root keys $RK_I$ of their subordinate responsible devices $RG_I$ by diversification of their own root cryptographic key $RK_i$ and of the identifier $IR_I$ of the subordinate responsible device by a first, nonreversible cryptographic function F1.

They comprise, connected to the first generation means 12, means 14 for supplying root cryptographic keys $RK_I$ thus generated to the subordinate responsible devices $RG_I$.

The devices $RG_i$ also comprise second means 16 for generating transport cryptographic keys $TK_{ik}$ by diversification of their own root cryptographic key $RK_i$ and of one of the identifiers $IG_{ik}$ of the set of identifiers of the group $G_i$ by a second, nonreversible cryptographic function F2.

The transport cryptographic keys are used to encrypt communications between all the members of the group.

They comprise, connected to the second means 16 for generating means 18 for supplying transport cryptographic keys $TK_{ik}$ to each device $MG_{ij}$ that is a member of the group $G_i$.

Figure 3:
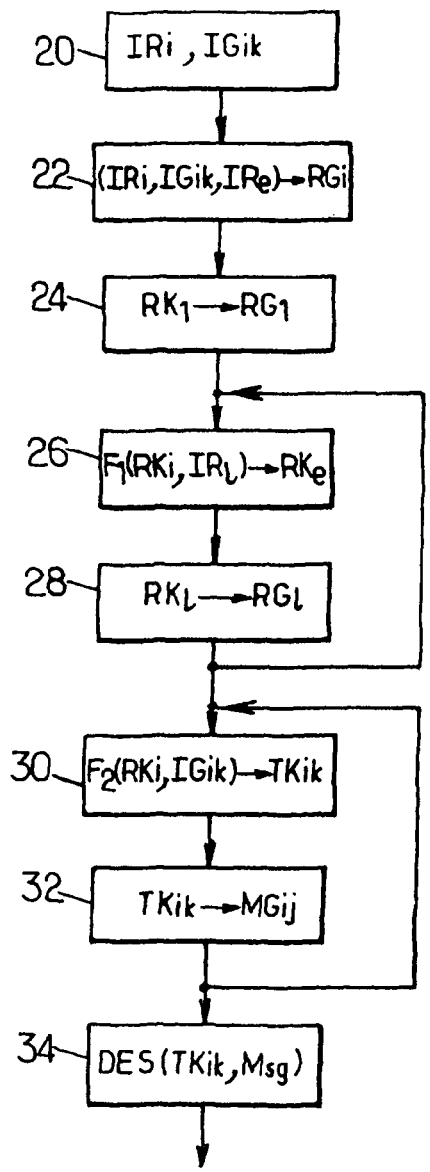
FIG. 3 is a flowchart of an embodiment of the method for distributing cryptographic keys according to the invention.

The computation and distribution of the keys is carried out according to the following method, FIG. 3.

For each group $G_i$, in the step 20, a first identifier is defined $IR_i$ associated with the device responsible for the group $G_i$ and a set of identifiers $IG_{ik}$, k varying between 1 and n. During this step for defining identifiers, a check is made to ensure that each one is unique in the network. This step is carried out, for example, by an operation of random selection without duplicate, or else by taking consecutive series of whole numbers.

Each device $RG_i$ responsible for the group $G_i$ receives and stores, in step 22, the identifier $IR_i$ and the identifiers $IG_{ik}$ for its group and the identifiers $IR_I$ for the subordinate responsible devices $MG_i/RG_i$.

A root cryptographic key $RK_1$ is stored, in step 24, in the device $RG_1$ of the first higher group $G_1$. It should be noted that, by its hierarchical position, the device $RG_1$ is a subordinate member of no group. This installation can be carried out, for example, according to a method of the prior art for access to a central server or else may correspond to the generation of the key in the device $RG_1$, for example by generation of a random number.

The steps 20 and 22 for defining and distributing identifiers, and the step 24 for storing the root cryptographic key $RK_1$ are preferably carried out before the structure is engaged in operation.

It should be noted that, although described consecutively, these steps may be carried out in a different order or in parallel.

In a step 26, the root cryptographic key $RK_1$ is diversified with each identifier $IR_I$ of each subordinate responsible device $RG_I$ by using the nonreversible cryptographic algorithm F1, for example the SHA algorithm. The result of the diversification operation is transferred, in step 28, by the responsible device $RG_I$ and becomes the root key $RK_I$ of the responsible device.

The steps 26 and 28 for diversification and transfer are repeated by each responsible device following the hierarchical tree structure of the network corresponding to the broadcast of the root cryptographic keys until all of the responsible devices of the network have their root cryptographic key.

Inside each group $G_i$, the responsible device $RG_i$ diversifies, in step 30, its root cryptographic key $RK_i$ with one of the identifiers $IG_{ik}$ of the group by using a second, nonreversible cryptographic algorithm F2. According to the security constraints of the system, the algorithms F1 and F2 may be the same or different.

The result of the diversification operation is transferred, in step 32, to each device $MG_{ij}$ that is a member of the group Gi in order to become a transport cryptographic key $TK_{ik}$.

This transport key $TK_{ik}$ is used, in step 34, to encrypt the communications inside the group. Preferably it corresponds to a symmetrical encryption algorithm key such as DES or AES.

Preferably, the steps 30 and 32 are repeated for all the identifiers IGik of the group. Thus each member of the group has a set of transport cryptographic keys, which makes it possible easily, either manually or automatically, to modify the transport cryptographic key used whenever necessary. For example, in an environment requiring great security of communications, the transport cryptographic key can be modified according to a variable timing rate, for example, in a random manner.

In a particular embodiment, each identifier $IG_{ik}$, and therefore each transport cryptographic key $TK_{ik}$ generated from this identifier, has a reference number, which can be the identifier itself. This reference number is concatenated in clear with each message encrypted with the corresponding transport cryptographic key $TK_{ik}$. Therefore, the device receiving the message easily knows the transport cryptographic key to be used to decrypt the message.

This reference number also advantageously makes it possible to carry out subsequent analyses of the interchanged messages.

Specifically, in a particular embodiment, all of the messages encrypted and concatenated with the reference number are recorded and stored on a network server. Similarly, all of the identifiers used in the network and the root key $RK_1$ are stored in a central device outside of the hierarchized network.

By using the method described, the staff personnel who therefore know all of the identifiers used in the network and the root key RK1 are capable of reconstructing all of the transport keys used in the network with their reference number.

Therefore, these personnel are capable of decrypting the recorded encrypted communications in order, for example, to carry out a post mortem analysis of the events.

The method and the system of distributing cryptographic keys can be combined with other cryptographic techniques known to those skilled in the art in order to strengthen its security.

For example, it is possible to use automatic authentication cryptographic techniques or techniques combining a manual authentication with an automatic authentication in order to verify and validate the distribution of the keys to approved devices.

What has been described therefore is a method and a system for distributing cryptographic keys in a hierarchized network which advantageously allows a decentralized management of the cryptographic keys while respecting the hierarchical structure of the network. Because of this, the distribution of the keys can be carried out as close as possible to the locations where the users are engaged. Therefore, the network can be reconfigured or devices can be added to a group simply by being authenticated with the device responsible for the group.

The invention claimed is:

1. A method for distribution of cryptographic keys in a hierarchized network comprising at least one device responsible for a first group of devices as a higher group, one or more devices of the first group of devices also being responsible for a second group of devices lower than the first group of devices, the method comprising the steps, at the at least one device responsible for the higher group, of:
   a. storing
       a set of identifiers specific to the first group of devices,
       an identifier specific to the responsible device of the first group of devices,
       an identifier for each device responsible for the second group of devices, each identifier being unique inside the hierarchized network,
   b. storing a root cryptographic key,
   c. supplying the root cryptographic key to the each device responsible for the second group of devices by derivation from the root cryptographic key and from the identifier for each device responsible for the second group of devices by a first, nonreversible cryptographic function, and
   d. supplying one or more transport cryptographic keys to each member of the first group of devices by derivation from the root cryptographic key and from an identifier belonging to the set of identifiers specific to the first group of devices by a second, nonreversible cryptographic function.

2. The method as claimed in claim 1, wherein communications between devices of a same group are encrypted with the one or more transport cryptographic keys, each communication being accompanied by a reference to the identifier that has been used to generate the one or more transport cryptographic keys.

3. The method as claimed in claim 2, wherein each identifier of a set of identifiers of a group is referenced by a unique index number in the hierarchized network, this index number being used as a reference of the identifier in the communications.

4. The method as claimed in claim 1, wherein the set of identifiers of the first group of devices and the identifiers of responsible devices are stored in a central device outside the hierarchized network so that knowledge of the root cryptographic key of the device responsible for the higher group allows the regeneration of each root cryptographic key and the one or more transport cryptographic keys of the hierarchized network.

5. The method as claimed in claim 1, wherein the use of a new transport cryptographic key is carried out according to a variable timing rate.

6. At least one nontransitory computer readable medium comprising computer instructions that when executed by a computer performs the method as claimed in claim 1.

7. A method for distributing cryptographic keys in a hierarchized network comprising at least one device responsible for a first group of devices, the method being applied by a device of the first group of devices also responsible for a second group of devices lower than the first group of devices, comprising the steps of:
   storing an identifier that is specific to the at least one device responsible for the first group of devices and is unique in the hierarchized system,
   storing a root cryptographic key, derived by the at least one device responsible for the first group of devices from a root cryptographic key of the at least one device responsible for the first group of devices and from the identifier specific to the at least one device responsible for the first group of devices, storing a set of identifiers specific to the second group of devices, generating at least one transport cryptographic key by derivation from the root cryptographic key and from one of the identifiers of the set of identifiers specific to the second group of devices, and distributing the at least one transport cryptographic key to devices that are members of the second group of devices.

8. At least one nontransitory computer readable medium comprising computer instructions that when executed by a computer performs the method as claimed in claim 7.

9. A system for distributing cryptographic keys in a hierarchized network comprising at least one device responsible for a first group of devices, and at least one device of the first group of devices also being responsible for a second group of devices lower than the first group of devices, the system comprising:

each of the first and second group of devices, a set of identifiers that is specific thereto, and, for each device responsible for the first and second a group of devices, a responsible-device identifier that is specific thereto and unique in the hierarchized network;

at least one storage module for the at least one device of the first group of devices also being responsible for the second group of devices;

a root cryptographic key in the at least one device responsible for the first group of devices;

a root cryptographic key supplied to each device responsible for the second group of devices by derivation from the root cryptographic key of the at least one device responsible for the first group of devices and from the identifier of the at least one device of the first group of devices also responsible for the second group of devices by a first, nonreversible cryptographic function; and for each group of devices, at least one transport cryptographic key supplied to each member of the each group of devices by derivation from the root cryptographic key of a device responsible for the each group of devices and from an identifier belonging to a set of identifiers of the each group of devices by a second, nonreversible cryptographic function.

10. A device responsible for a first group of devices in a hierarchized network, comprising:

storage for a root cryptographic key, storage for a first identifier that is specific to the first group of devices and is unique in the hierarchized network and of a set of identifiers specific to the first group of devices, and of at least one second identifier of a device responsible for a second group of device lower than the first group of devices, the device responsible for the second group of devices also belonging to the first group of devices, a transport cryptographic key obtained by derivation from the root cryptographic key and from one of the set of identifiers specific to the first group of devices, a root key derived from the root cryptographic key and from the at least one second identifier of the device responsible for the second group of devices.

* * * * *